United States Patent [19]

Iwamura et al.

[11] 4,333,751

[45] Jun. 8, 1982

[54] MULTI-STAGE MOVING BED TYPE ADSORPTION DEVICE

[75] Inventors: Seiji Iwamura; Hiromi Tanaka, both of Abiko, Japan

[73] Assignee: Sumitomo Heavy Industries, Ltd., Tokyo, Japan

[21] Appl. No.: 177,300

[22] Filed: Aug. 11, 1980

[30] Foreign Application Priority Data

Aug. 16, 1979 [JP] Japan ............................. 54-104700

[51] Int. Cl.³ ..................... B01D 53/08; B01D 46/34
[52] U.S. Cl. ........................................ 55/390; 55/474; 55/479; 55/484; 55/485; 422/171; 422/190; 422/191; 422/216; 422/239
[58] Field of Search .................. 55/390, 474, 479, 484, 55/485, 516, 518, 519; 422/177, 178, 191, 197, 216, 238, 239, 171, 190

[56] References Cited

U.S. PATENT DOCUMENTS

| | | | |
|---|---|---|---|
| 2,604,187 | 7/1952 | Dorfan | 55/474 |
| 3,716,969 | 2/1973 | Maeda | 55/390 |
| 4,095,953 | 6/1978 | Gutterman et al. | 422/216 |

FOREIGN PATENT DOCUMENTS

| | | | |
|---|---|---|---|
| 533037 | 8/1931 | Fed. Rep. of Germany | 55/390 |
| 54-47901 | 7/1979 | Japan | 55/390 |
| 55-48001 | 1/1980 | Japan | 55/390 |

*Primary Examiner*—David L. Lacey
*Attorney, Agent, or Firm*—Blanchard, Flynn, Thiel, Boutell & Tanis

[57] ABSTRACT

A multi-stage moving bed type adsorption device which comprises a unit made of a chamber filled with adsorbent particles which chamber is defined by fore and rear louvers, the distance therebetween being larger downwardly, fore and rear lower walls extending downwardly from the lower end of the respective louvers, the distance therebetween being narrower downwardly, and two right and left side walls, an inverted V-shaped cross-sectional rectifying body extending horizontally from the right side wall to the left side wall and a rectifying plate extending downwardly from the top of said rectifying body vertically, the latter two means being located in the lower region of the said chamber, a plurality of said units being placed one upon another and communicated mutually by virtue of a coupling means consisting of vertical fore and rear walls and side walls; a gas-circulating vessel including a plurality of thus communicated units therein; an adsorbent particle inlet port provided at the top of the uppermost unit; and an adsorbent particle discharging means provided at the bottom of the lowest unit, wherein the adsorbent particles flowing down within each unit are brought into contact with the gas passing through the gas-circulating vessel in a cross current manner.

2 Claims, 3 Drawing Figures

MULTI-STAGE MOVING BED TYPE ADSORPTION DEVICE

BACKGROUND OF THE INVENTION

This invention relates to an improved, cross current, moving bed type adsorption device for use in removing specific components contained in a gas, such as the sulfur oxides contained in an exhaust gas.

In the case where a large volume of gas is treated with a solid adsorbent it is known that the cross current, moving bed type, adsorption device is advantageous in the points of equipment area, controllability of the flow rate of the adsorbent and gas load, said device being constructed so that the gas flow is brought into contact with the adsorbent particle moving bed in a cross current manner. U.S. Pat. No. 3,716,969 issued to Isamu Maeda describes that a continuous moving layer adsorption device employed in an exhaust gas desulfurization system is made of an adsorption vessel as the main body filled with activated carbon and a rectifying device included therein, the adsorption vessel main body comprising a side wall provided with a number of louvers and located at the gas-introducing side of the vessel, another side wall having delivery holes located at the gas-exhausting side of the vessel, the distance between the gas-introducing side wall and the gas-exhausting side wall being larger toward the downward portion of the vessel, a hopper-like portion provided adjacently below the two side walls, and an elongated port provided at the bottom of the hopper-like portion for delivering the activated carbon; and the rectifying device comprising a rectifying body placed in the hopper-like portion and a rectifying plate extended downwardly from the rectifying body. According to this adsorption device, the center-dropping phenomenon and the suspension phenomenon of adsorbent particles can be prevented, said phenomena being apt to take place in the moving bed of the box-type moving bed adsorption device, thereby ensuring the uniform flow down of adsorbent particles. In this connection, the center-dropping phenomenon is defined to be a phenomenon wherein the centrally located portion in the layers of the adsorbent particles just above the discharging port fall down prematurely, and the suspension phenomenon is defined to be a phenomenon wherein the adsorbent particles filled inside of the adsorption vessel is suspended in a crust-like configuration caused by a lateral compressive force, both of which are detailed in U.S. Pat. No. 3,716,969.

However, even such a device involves many troubles in order to achieve the uniform gas distribution. The reason is that in order to increase the gas treating capacity of the device it is inevitably necessary to increase the height of the adsorbent filled layer and consequently there is created a conspicuous difference in layer pressure between the particles located at the upper part and those located at the lower part thereof since the adsorbent filled bed is made to have a divergent structure, whereby the amount of the exhaust gas passing through the upper part is markedly increased. In addition, the increase in the height of the adsorbent particle layer brings about troubles such that the particles located at the bottom of the layer are liable to crush and wear by their own pressure and further attention must be paid to a probability that the uniform flow down of particles is disturbed, although it is caused partly because the width of the bed is increased as a result of employing a large-scale equipment. Accordingly, it is natural that the device of U.S. Pat. No. 3,716,969 as it stands has a limitation in its capacity.

SUMMARY OF THE INVENTION

This invention has solved the above mentioned various problems in an extremely simple manner by integrally connecting a plurality of adsorbent filled chambers constructed as taught by U.S. Pat. No. 3,716,969 in series and communicating them with each other, and further dividing each of the thus communicated adsorbent filled chambers with partition walls parallel to the gas flowing direction as occasion demands.

In more detail, this invention provides a multi-stage moving bed type adsorption device which comprises a unit made of a chamber filled with adsorbent particles, said chamber is defined by fore and rear louvers, the distance therebetween being larger downwardly, fore and rear lower walls extending downwardly from the lower ends of the respective louvers, the distance therebetween being narrower downwardly, right and left side walls, an inverted V-shaped cross-sectional rectifying body extending horizontally from the right side wall to the left side wall and a rectifying plate extending downwardly from said rectifying body vertically, the latter two means being located in the lower region of the said chamber, a plurality of said units being placed one upon another and communicated mutually by virtue of a coupling means consisting of two vertical fore and rear walls and side walls; a gas-circulating vessel including a plurality of thus communicated units therein; an adsorbent particle inlet port provided at the top of the uppermost unit; and an adsorbent discharging means provided at the bottom of the lowest unit, wherein the adsorbent flowing down within each unit while forming a moving bed is brought into contact with the gas passing through the gas-circulating vessel in a cross current manner.

DETAILED DESCRIPTION OF THE INVENTION

Figure 1:
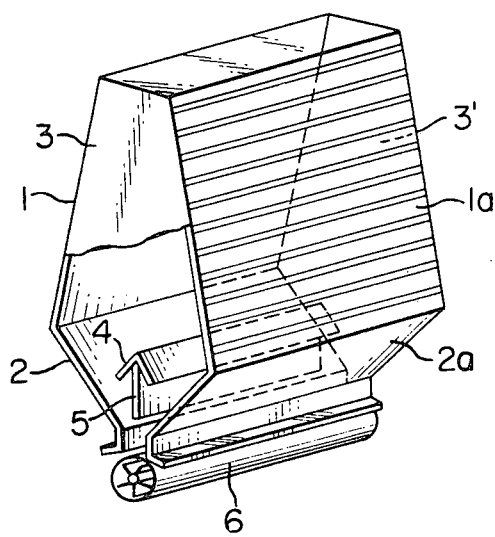
FIG. 1 is a perspective view illustrating the construction of the adsorption chamber unit used in this invention.

In the perspective view illustrated in FIG. 1, an adsorption chamber unit to be filled with adsorbent is defined by fore and rear louvers 1 and 1a, the distance therebetween being larger downwardly, fore and rear lower walls 2 and 2a extending downwardly from the lower ends of the respective louvers, the distance therebetween being narrower downwardly, and right and left side walls 3 and 3'. An inverted V-shaped cross-sectional rectifying body 4 extends horizontally from the right side wall to the left side wall and a rectifying plate 5 extends vertically downwardly from the top of said rectifying body 4 in the lower region of the said chamber. The adsorbent flows down within the adsorption chamber while forming a moving bed. On the other hand, the gas enters into the adsorption chamber through the gaps of the louver 1, then contacts with the adsorbent moving bed there and thereafter leaves the adsorption chamber through the gaps of the louver 1a. In the multi-stage type cross current moving bed adsorption device according to this invention, wherein a plurality of the thus constructed adsorption chamber units are placed one upon another, generally speaking, it is desirable that the height of each unit should be in the range of from 2 to 6 m, preferably in the range of from 4 to 5 m, taking into consideration its balance with the pressure of the masses of adsorbent.

Figure 2:
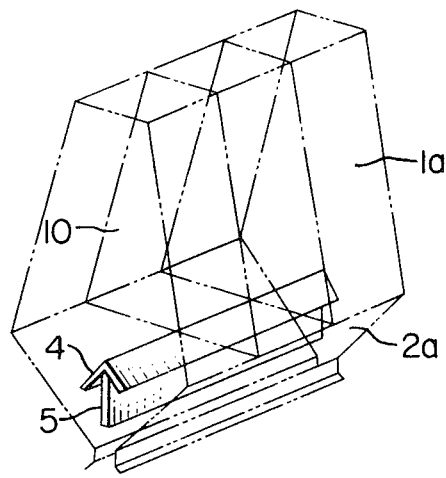
FIG. 2 is a perspective view wherein the adsorbent filled chamber shown in FIG. 1 is divided by means of partition walls.

It is to be noted that in FIG. 1 numeral 6 designates a roll feeder as an example of the adsorbent discharging means and that this discharging means is installed only in the lowest unit but not in the other units. Furthermore, according to this invention, the upper region of the adsorption chamber, as shown in FIG. 2, can be divided into plural compartments by means of partition walls 10 extending parallel to the direction of flow of the gas.

Figure 3:
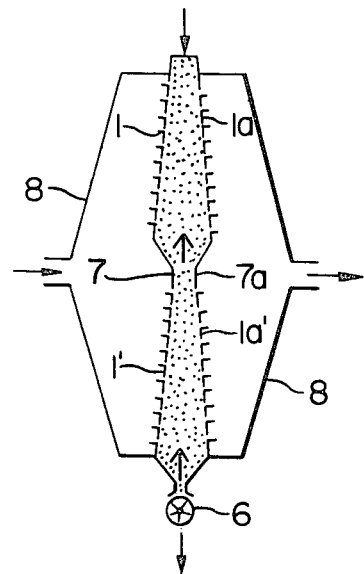
FIG. 3 is a sectional side elevation of one embodiment of the multi-stage moving bed type adsorption device of this invention.

The multi-stage moving bed type adsorption device according to this invention is so constructed that a plurality of the above mentioned units are communicated with each other in series by means of a coupling means and the same is included within a gas-circulating vessel, one embodiment thereof being illustrated in FIG. 3. In FIG. 3, the upper stage unit and the lower stage unit are communicated with each other by means of a coupling means consisting of fore and rear vertical walls 7 and 7a and right and left side walls (not shown), whereby the adsorbent can successfully be transferred from the upper stage unit to the lower stage unit uniformly. And, said two upper and lower stage units are included within a gas-circulating vessel 8, the top of the upper stage unit opens as an adsorbent inlet port and the bottom of the lower stage unit is provided with a discharging means 6.

Although the adsorption chamber units are piled up in two stages in the cases of embodiment illustrated in FIG. 3, it is to be noted that as a matter of course it is also possible for the present device to pile units up in three stages or more depending on the volume of gas to be treated, the strength of the adsorbent and so forth.

As is evident from the above, the multi-stage type, cross current, moving bed, adsorption device according to this invention, which comprises a plurality of units piled up in series, is capable of treating a large volume of gas with a reduced equipment area. Further, since each unit is made to have a divergent structure including the rectifying means and is communicated respectively by means of a coupling means consisting of vertical fore and rear walls and right and left side walls, the adsorbent is permitted to flow down within each unit uniformly. Still further, this invention avoids the trouble that would be caused by the pressure of a large amount of the adsorbent because it is unnecessary in this invention to increase the height of each unit, specifically, the height of the adsorbent layer in each unit, when a large volume of gas is treated thereby. Still more further, this invention, wherein each unit is made to have a divergent structure, can lower the space velocity of the gas passing through the lower region of each unit.

I claim:

1. A multi-stage, moving bed-type, adsorption apparatus, comprising:

a gas-circulating vessel having a gas inlet and a gas outlet for gas to be treated;

a plurality of adsorption chamber units, said adsorption chamber units being located inside said vessel between said gas inlet and said gas outlet, and filled with adsorbent particles and being arranged in vertical alignment one above the other so that adsorbent particles can flow downwardly through said units in series; each of said adsorption chamber units comprising opposed, upwardly extending, horizontally spaced-apart, front and rear, upper walls, said upper walls comprising louvers so that gas can be fed through the louvers in one of said upper walls and can be discharged through the louvers in the other of said upper walls, the upper ends of said upper walls being horizontally spaced from each other to define an inlet for said adsorbent particles, said upper walls diverging with respect to each other in the downward direction; opposed, horizontally spaced-apart, front and rear, lower walls extending downwardly from the lower ends of said front upper wall and said rear upper wall, respectively, said lower walls converging toward each other in the downward direction with the lower ends of said lower walls being horizontally spaced from each other to define an outlet for adsorbent particles; a pair of side walls extending between said front and rear, upper and lower walls at the opposite ends thereof, respectively, for closing the space therebetween so that said upper, lower and side walls define a chamber for containing said adsorbent particles, a horizontal rectifying body which is of inverted V-shape in cross section and a vertical rectifying plate extending downwardly from the apex of said rectifying body, said rectifying body and said rectifying plate being centrally located in the lower portion of said chamber between said front and rear lower walls and extending horizontally between said side walls; a coupling passage extending downwardly from the adsorbent outlet of each of said adsorption chamber units, except the lowermost one thereof, to the adsorbent inlet of the adjacent adsorption chamber unit located therebelow, each said coupling passage being located directly vertically below the rectifying body of the adsorption chamber unit disposed thereabove, each said coupling passage being defined by opposed, horizontally spaced-apart, front and rear, vertical walls which extend downwardly from the lower ends of the front and rear lower walls of the upper adsorption chamber unit to the upper ends of the front and rear upper walls of the adjacent lower adsorption chamber unit so that adsorbent particles leaving the adsorbent outlet of the upper adsorption chamber unit flow through said coupling passage into the adsorbent inlet of the adjacent lower adsorption chamber unit; and an adsorbent particle discharging means provided at the adsorbent outlet of the lowermost adsorption chamber unit.

2. The multi-stage, moving bed-type, adsorption device as claimed in claim 1, including at least one vertical partition wall provided in said chamber, said partition wall extending upwardly from the lower ends to the upper ends of said front and rear upper walls and extending horizontally between said front and rear walls parallel to the direction of flow of the gas through said chamber and dividing the upper portion of said chamber into a plurality of sub-chambers.

* * * * *